(12) United States Patent
Mustafa et al.

(10) Patent No.: US 12,522,524 B2
(45) Date of Patent: *Jan. 13, 2026

(54) METHOD FOR SIMULTANEOUS CARBON DIOXIDE CAPTURE AND VALORIZATION OF INDUSTRIAL BRINE USING A TWO-STAGE ELECTRODIALYSIS PROCESS

(71) Applicant: UNITED ARAB EMIRATES UNIVERSITY, Al Ain (AE)

(72) Inventors: Jawad Mustafa, Al Ain (AE); Ali H. Al-Marzouqi, Al Ain (AE); Nayef Mohamed Ghasem, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

This patent is subject to a terminal disclaimer.

(21) Appl. No.: 18/961,927

(22) Filed: Nov. 27, 2024

(65) Prior Publication Data
US 2025/0091914 A1 Mar. 20, 2025

Related U.S. Application Data

(62) Division of application No. 18/201,391, filed on May 24, 2023, now Pat. No. 12,187,629.

(51) Int. Cl.
*C02F 1/469* (2023.01)
*C02F 1/26* (2023.01)

(52) U.S. Cl.
CPC ............ *C02F 1/4693* (2013.01); *C02F 1/265* (2013.01)

(58) Field of Classification Search
CPC ............................... C02F 1/4693; C02F 1/265
See application file for complete search history.

(56) References Cited

U.S. PATENT DOCUMENTS

| 5,645,703 A * | 7/1997 | Tsai ...................... B01D 61/445 |
| | | 204/538 |
| 6,755,951 B1 * | 6/2004 | Mani .................... B01D 61/445 |
| | | 204/531 |
| 10,626,037 B2 | 4/2020 | Lienhard et al. |
| 10,954,150 B2 | 3/2021 | Wallace |
| 11,396,469 B2 | 7/2022 | Al-Anzi |
| 2012/0211421 A1 * | 8/2012 | Self ........................ B01D 53/80 |
| | | 210/205 |

(Continued)

FOREIGN PATENT DOCUMENTS

WO 2019/046628 A1 3/2019

OTHER PUBLICATIONS

Reig, Mònica, et al. "Concentration of NaCl from seawater reverse osmosis brines for the chlor-alkali industry by electrodialysis." Desalination 342 (2014): 107-117.

(Continued)

*Primary Examiner* — Hayden Brewster
(74) *Attorney, Agent, or Firm* — Nath, Goldberg & Meyer; Joshua B. Goldberg

(57) ABSTRACT

A system of treating reject brine and capturing carbon dioxide ($CO_2$) includes a two-stage electrodialysis (ED) process for producing multiple products with high purity from rejected brine and flue gas mixtures (10% $CO_2$ and 90% $N_2$) emitted from an industrial plant. According to an embodiment, the system includes a first electrodialysis (ED) stage and a second electrodialysis (ED) stage in series.

8 Claims, 11 Drawing Sheets

(56) References Cited

U.S. PATENT DOCUMENTS

2015/0299003 A1* 10/2015 Fu .......................... B01D 61/58
2020/0332325 A1* 10/2020 Jennewein ............... C07H 1/06

OTHER PUBLICATIONS

Liu, Jie, et al. "Concentrating brine from seawater desalination process by nanofiltration-electrodialysis integrated membrane technology." Desalination 390 (2016): 53-61.

Mustafa, Jawad, et al. "Electrodialysis based waste utilization methodology for the desalination industry." Desalination 520 (2021): 115327.

Mustafa, Jawad, et al. "Treatment of saline wastewater and carbon dioxide capture using electrodialysis." 2021 6th International Conference on Renewable Energy: Generation and Applications (ICREGA). IEEE, 2021.

* cited by examiner

METHOD FOR SIMULTANEOUS CARBON DIOXIDE CAPTURE AND VALORIZATION OF INDUSTRIAL BRINE USING A TWO-STAGE ELECTRODIALYSIS PROCESS

CROSS-REFERENCE TO RELATED APPLICATION

This application is a divisional of U.S. patent application Ser. No. 18/201,391, filed on May 24, 2023, the entire contents of which are incorporated herein by reference.

BACKGROUND OF THE INVENTION

Field of the Invention

The disclosure of the present patent application relates to the treatment of industrial waste, and particularly, to a two-stage electrodialysis (ED) system for treating reject brine and capturing carbon dioxide ($CO_2$).

Description of Related Art $CO_2$ and rejected brine, or saline water, are the two most common and abundant pollutants emitted from most industries, such as desalination, oil and gas, fertilizer, textile, coal-to-chemical, food, and dairy industries. In addition to posing severe environmental threats, these pollutants are expensive to manage, hindering the economic efficiency of the industries. Therefore, a cost-effective, energy-efficient, environmentally friendly, and sustainable approach for managing these pollutants is crucial for the environment and industries.

Desalination produces a large amount of rejected brine every day. To produce 1 L of potable water, 1.5 L of rejected brine is emitted. Typically, the rejected brine is disposed into the sea, which harms aquatic species and pollutes the water. Although a significant improvement can be seen in the desalination process, little attention has been paid to the waste associated with the desalination process. Although it is possible to consider rejected brine as a resource instead of a waste since it contains significant amounts of precious metal components, separating these components with sufficient purity is a major challenge.

Direct reuse, brine minimization, and direct disposal are three main methods for disposing of rejected brine. Direct disposal methods for rejected brine include land disposal, surface water discharge, deep well injection, and evaporation ponds. Although surface water discharge is the most widely used and least expensive method, it causes adverse effects on aquatic life because of the high temperature and salinity of the water. The deep well injection process involves injecting rejected brine into deep aquifers. This is a costly process due to high drilling and well maintenance expenses. A long-term hazard associated with deep well injection can be variations in geological conditions due to earthquakes. While evaporation ponds are relatively simple, they require a lot of land, which makes them expensive. Direct disposal is least preferred because of its low productivity, high cost, and negative environmental impact. Direct reuse is beneficial for industries that emit relatively pure salts, but in most cases, the salt contains a mixture of various metal components. Therefore, the direct reuse method is less applicable. In view of the number of modifications that industries require, brine minimization is a costly option.

Chemical treatment can be used to remove hazardous components from rejected brines of low salinity, such as brackish water. Seeded slurry precipitation is regarded as one of the most critical chemical methods for treating brackish water to remove fouling-prone species like calcium sulfate. For the treatment of brackish water, biological and ion exchange methods have also been investigated.

Membrane-based technologies are typically used to treat brine with low salinity, such as reverse osmosis (RO) brine. With electrodialysis (ED), ions are transported by an electric current through semi-permeable membranes. Conventional ED methods are commonly used for removing salinity from low to moderate saline sources (salinity ~100,000 ppm). Higher salinity, however, may cause fouling and membrane precipitation. The forward osmosis membrane has previously been tested on a laboratory scale to treat the rejected brine, but membrane scaling and salt precipitation still posed a problem for sufficient flux.

The rejected brine can also be treated using thermal processes. Evaporators, mechanical vapor compression, vacuum membrane distillation, and brine concentrators are examples of thermal processes for brine treatment. Like membrane processes, thermal processes also suffer from low performance due to salt precipitation, which causes lower heat and mass transfer, resulting in lower clean water flux. Additionally, thermal processes require significant energy. Membrane distillation consumes approximately 22-67 kWh/$m^3$, which is relatively high compared to other membrane-based technologies. Despite this, membrane distillation consumes less energy than other thermal processes, such as evaporation and crystallization.

Thus, conventional rejected brine treatment processes have many limitations, including high energy consumption, low performance, and limited scalability.

The second type of waste emitted by industries, particularly in the desalination industry, is $CO_2$ emissions. Because of its persistent presence in the atmosphere, $CO_2$ contributes significantly to global warming. The Paris Agreement was signed between 195 nations in 2015 at the Paris Climate Conference (COP21) to limit the global average temperature rise to below 2° C. However, currently, this temperature limit exceeds 2%. Large-scale consumption of coal and fossil fuels contributes significantly to $CO_2$ emissions in the atmosphere. The coal, gas, and oil used in the generation of power account for 60% of all $CO_2$ emissions. The Middle East is one of the most significant contributors to $CO_2$ emissions, mainly associated with the desalination industry. It has been estimated that 15846 tons of $CO_2$ are emitted per day from different desalination processes in the UAE.

There are three main types of $CO_2$ capturing processes: pre-combustion, oxyfuel combustion, and post-combustion. A pre-combustion or oxyfuel combustion uses oxygen to burn the fuel and generates electricity. Hence, it is possible to obtain higher concentrations of $CO_2$ by using pure oxygen instead of air, which can then be liquified for transportation, usage, and storage. In this method, flue gases can also be recycled to increase the concentration of $CO_2$. A post-combustion process involves passing through various post-processing stages to store flue gas (concentrated with $CO_2$). Since post-combustion is easy to integrate with existing industries, it is considered to be more advantageous in terms of cost than pre-combustion.

Adsorption, biotechnological materials, absorption, and membranes are the most widely used methods for $CO_2$ capture. Absorption is a well-known industrial process and involves the use of various solvents, such as amine solutions. Mono-ethanolamine solvent is reported to recover $CO_2$ at a rate of 98%. In adsorption, various adsorbents can be used to capture $CO_2$ and chemical reactions may also be involved. Zeolites and activated carbon are the most commonly used adsorbents. Several studies have investigated the use of inorganic or polymeric membranes and have achieved promising results. The performance of $CO_2$ separation increases with increasing stages, and membrane types are selected based on selectivity and permeability. One study examined the performance of different types of polymeric membranes, such as polysulfone, polyetherimide, polyimide, polyethersulfone, poly-dimethylphenylene oxide, and polyacrylonitrile to achieve high $CO_2$ capture efficiency. Usually, inorganic membranes are preferred where the pressure drop is high because they have high mechanical strength. Titania, silicon carbide, alumina, zeolite, and zirconia membranes are among the most widely reported inorganic membranes for $CO_2$ capture.

Another method of capturing $CO_2$ is through synthetic or natural mineralization. This method involves the reaction of $CO_2$ with silicates to form carbonates. It is considered a safe and sustainable way to capture $CO_2$. Various chemical and biological catalysts have been found to accelerate carbonation reactions. For example, a biological catalyst, carbonic anhydrase, was found to speed up the carbonation reaction. Researchers have tested serpentine, olivine, k-feldspar, steel slag, fly ash, and phosphogypsum for carbonation. Due to low reactivity, these materials require pre-treatment through acid dissolution and thermal activation. Electrochemical mineralization of magnesium, calcium salts, silicates, and industrial wastes can enhance $CO_2$ capture.

In conventional processes, both $CO_2$ and rejected brine are treated in a separate process. In addition, these processes are energy-intensive, expensive, and inefficient. These pollutants ($CO_2$ and rejected brine) can be handled best by combining them in a single reaction. Solvay's process is known for simultaneously removing sodium chloride (NaCl) from water and capturing $CO_2$ to produce valuable products such as $Na_2CO_3$ and $NaHCO_3$. However, if the rejected brine (a mixture of different salts) is used instead of pure NaCl, the by-products will contain different components, thereby lowering their purity and economic value. Furthermore, high temperatures, pressures, and expensive solvents increased the cost of the process. In addition, the Solvay process uses hazardous solvents that are disposed of into the environment, causing environmental pollution. Although several modifications to the Solvay process have been proposed, these processes are energy intensive and add to the process costs. Therefore, it is imperative to find a process that can economically, efficiently, and sustainably remove these pollutants ($CO_2$ and rejected brine).

Electrodialysis (ED) has been used to convert $CO_2$ to $NaHCO_3$ by feeding the ED cell with carbonic acid ($CO_2$ dissolved in water) and pure NaCl solution. Generally, these systems include additional units, including, nanofiltration and reverse osmosis (RO), rendering the system complicated and highly energy-intensive.

Both pollutants (brine and $CO_2$) are traditionally managed separately. Modified Solvay processes are the typical processes for handling these pollutants simultaneously in a combined reaction. In most cases, different reactors and different types of alkaline materials are used. However, the Solvay process and its modified versions still have certain limitations. The alkaline medium is entirely responsible for these processes. Due to the dependency on the expensive alkaline agent, the process ceases immediately after the entire alkaline material is consumed. This process is also costly due to the high operating conditions, such as high pressures, low temperatures, and high energy consumption. Alkaline agents are highly hazardous components and cannot be fully recovered, so the remaining unrecovered alkaline agent is disposed into the environment. Therefore, on one side, two pollutants are managed, and on the other side, one pollutant is released into the environment. Additionally, the product consists of multiple products depending on the brine components, lowering the purity of by-products; hence their utilization is limited.

Thus, a system for treating brine and capturing $CO_2$ emissions solving the aforementioned problems is desired

SUMMARY OF THE INVENTION

A system of treating reject brine and capturing carbon dioxide ($CO_2$) includes a two-stage electrodialysis (ED) process for producing multiple products with high purity from rejected brine and flue gas mixtures (10% $CO_2$ and 90% $N_2$) emitted from an industrial plant. According to an embodiment, the system includes a first electrodialysis (ED) stage and a second electrodialysis (ED) stage in series.

In an embodiment, a system for treating reject brine and capturing carbon dioxide ($CO_2$) from an industrial plant comprises a first electrodialysis (ED) stage including a plurality of cell pairs defined between cation exchange membranes, each cell pair including a multivalent ion chamber and a monovalent ion chamber, the multivalent ion chamber and the monovalent ion chamber being separated by an anion exchange membrane; a cathode and an anode at respective ends of the plurality of cell pairs, an anolyte chamber defined between the anode and an adjacent cation exchange membrane, and a catholyte chamber defined between the cathode and an adjacent cation exchange membrane, a second electrodialysis (ED) stage including a plurality of cell groups defined between bipolar membranes, each cell group including a flue gas chamber, a carbonate chamber adjacent the flue gas chamber, a concentrated brine chamber adjacent the carbonate chamber, and an acid chamber adjacent the concentrated brine chamber, the flue gas chamber and the carbonate chamber being separated by an anion exchange membrane, the carbonate chamber and the concentrated brine chamber being separated by a cation exchange membrane, the concentrated brine chamber and the acid chamber being separated by an anion exchange membrane; a cathode and a cathode at respective ends of the plurality of cell groups, an anolyte chamber defined between the anode and an adjacent semi-permeable membrane, a catholyte chamber defined between the cathode and an adjacent semi-permeable membrane, and a bubble contactor connected to the flue gas chamber; and a freeze-dryer.

The second ED stage can be connected to a bubble column contactor for dissolving the $CO_2$ from an industrial plant to form $CO_3^{-2}$ and $HCO_3^{-1}$ ions, with the dissolved $CO_2$ being circulated continuously in the carbonate chamber while a stream of water is provided to the acid chamber for acid collection.

According to an embodiment, a method of desalinating reject brine and flue gas emitted from an industrial plant, can include providing a first electrodialysis (ED) stage including an anolyte chamber, a catholyte chamber, and a plurality of cell pairs therebetween, each cell pair including a multivalent ion chamber and a monovalent ion chamber separated by an anion exchange membrane; providing reject brine from the industrial plant to the multivalent ion chamber and water to the monovalent ion chamber of each cell pair in the first ED stage; transporting NaCl and monovalent ions from the reject brine in the multivalent ion chamber through the anion exchange membrane to the monovalent ion chamber; collecting a stream of water and a multivalent ion mixture in a first output stream from the multivalent ion chamber and a concentrated NaCl rejected brine in a second output stream from the monovalent ion chamber; providing a second ED stage including a plurality of cell groups between anolyte and catholyte chambers, each of the cell groups including a flue gas chamber, a carbonate chamber, an anion exchange membrane separating the flue gas chamber and the carbonate chamber, a concentrated brine chamber, a cation exchange membrane separating the carbonate chamber and the concentrated brine chamber, an acid chamber, and an anion exchange membrane separating the concentrated brine chamber and the acid chamber; providing concentrated NaCl reject brine from the first ED stage to the concentrated brine chamber; providing water to the acid chamber; dissolving $CO_2$ from flue gas emitted from an industrial plant to provide $CO_3^{-2}$ and $HCO_3^{-1}$ ions from $CO_2$ using a bubble column contactor; transporting the $CO_3^{-2}$ and $HCO_3^{-1}$ ions to the carbonate chamber through the anion exchange membrane between the flue gas chamber and the carbonate chamber; transporting sodium ions from the concentrated brine chamber to the carbonate chamber through the cation exchange membrane to produce a sodium carbonate mixture; and transporting Cl ions from the concentrated brine chamber to the acid chamber through the anion exchange membrane to produce an acid mixture.

In an embodiment, the system can be used to simultaneously capture $CO_2$ and treat rejected brine emitted from multistage flash desalination plants. According to an embodiment, pollutants of the desalination industry can be handled simultaneously onsite, with multiple products being produced with high purity. It is a flexible process that can easily be integrated with the already available desalination plants. By reducing waste handling expenses, the proposed process can improve the overall economy of the desalination industry or other industries with similar emissions. In addition to being environmentally friendly, cost-effective, energy efficient, and sustainable, the system is a closed-loop waste management system and works on a zero-discharge principle.

These and other features of the present subject matter will become readily apparent upon further review of the following specification.

BRIEF DESCRIPTION OF DRAWINGS

(FIG. 5B) 420 minutes; and (FIG. 5C) after an initial fluctuation.

DETAILED DESCRIPTION

Figure 1A:
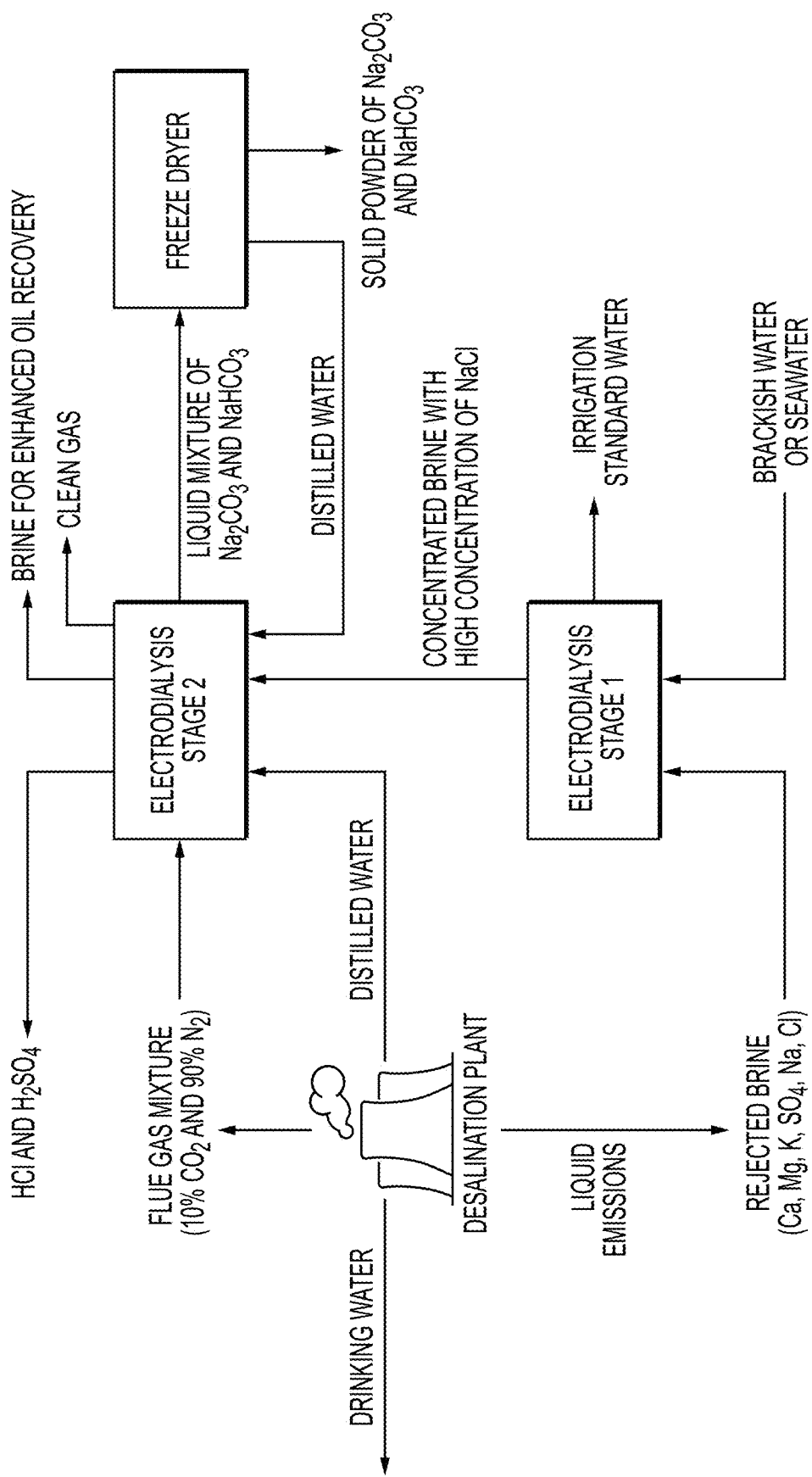
FIG. 1 is a schematic diagram of the system according to the present teachings.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Figure 1B:
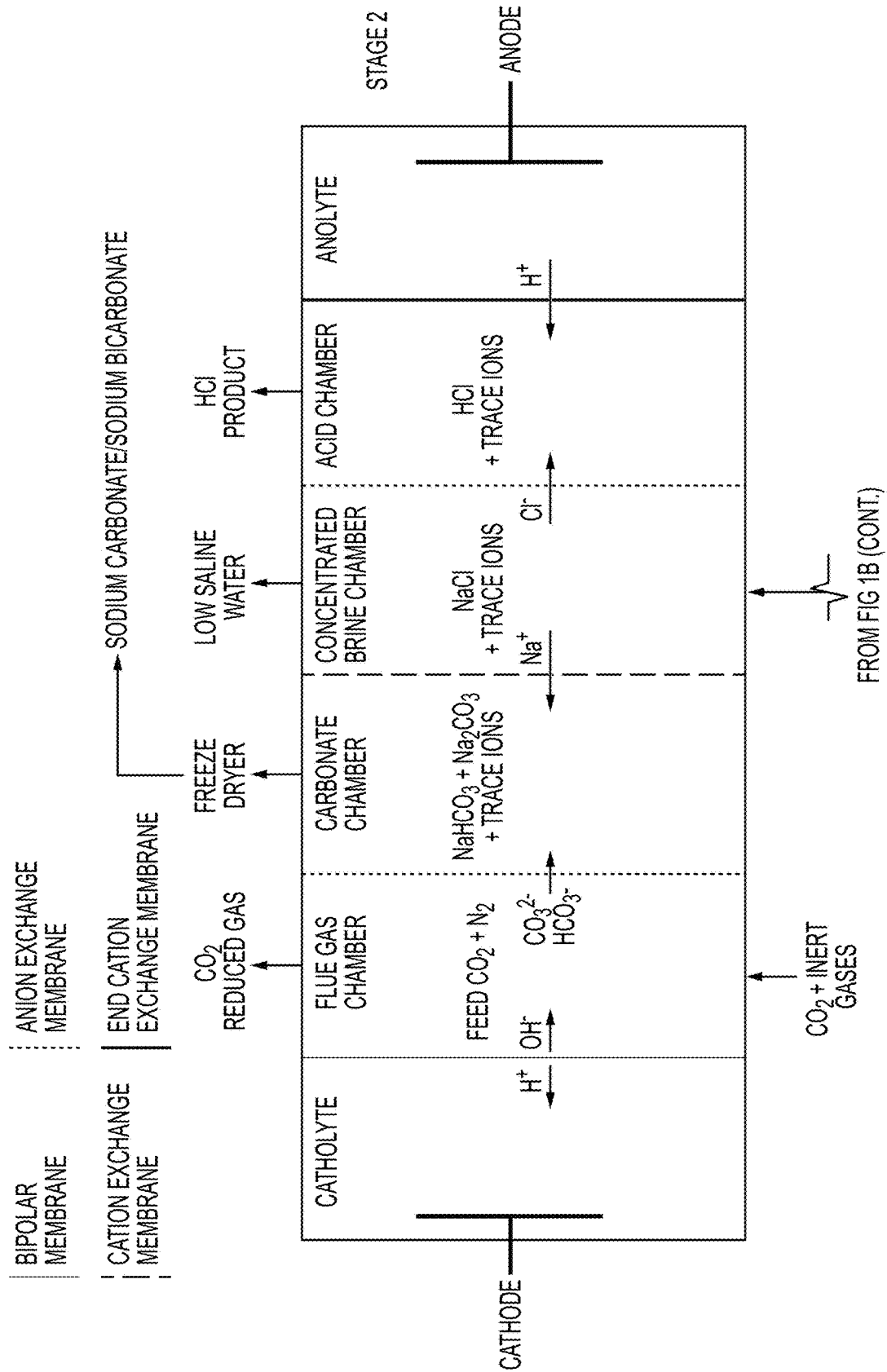
Figure 1B:
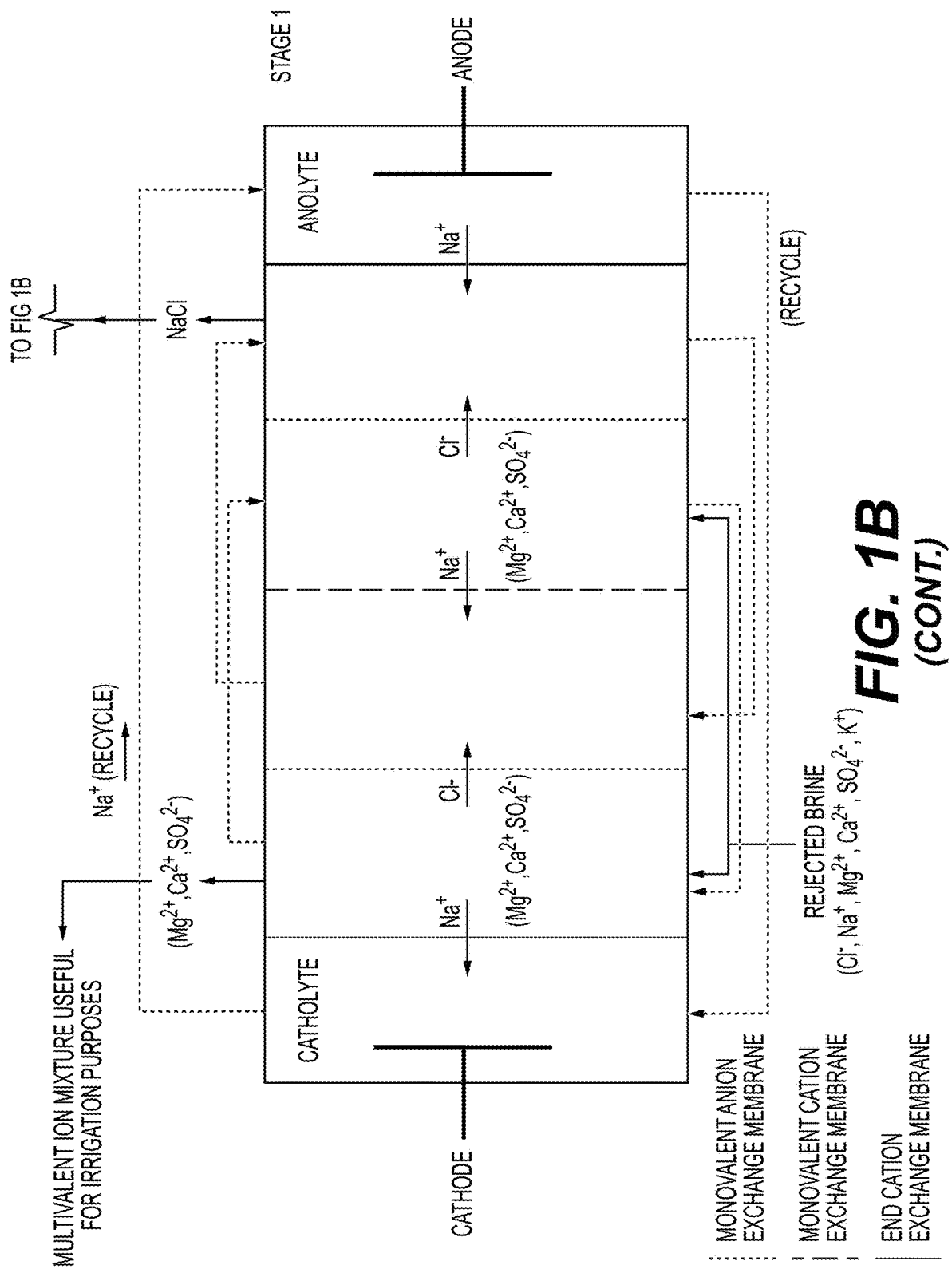

A system for treating reject brine and capturing carbon dioxide ($CO_2$) produces multiple products with high purity from rejected brine and flue gas mixtures (10% $CO_2$ and 90% $N_2$) emitted from an industrial plant. As shown in FIG. 1, the system for treating reject brine and capturing carbon dioxide ($CO_2$) includes a first electrodialysis (ED) stage, a second electrodialysis (ED) stage, and a freeze-dryer, as shown in FIG. 1. Each of the first and second electro dialysis (ED) stages is configured to transport ions through a series of semi permeable membranes, under the influence of an electric potential. The membranes can be cation- or anion-selective. Accordingly, either positive ions or negative ions will flow through the membranes. With the first and second ED stages, the system can produce multiple products with high purity from rejected brine and flue gas mixtures (10% $CO_2$ and 90% $N_2$). In an embodiment, the system can simultaneously capture $CO_2$ and treat rejected brine emitted from multistage flash desalination plants. Thus, pollutants of the desalination industry can be handled simultaneously onsite, with multiple products being produced with high purity.

Figure 2:
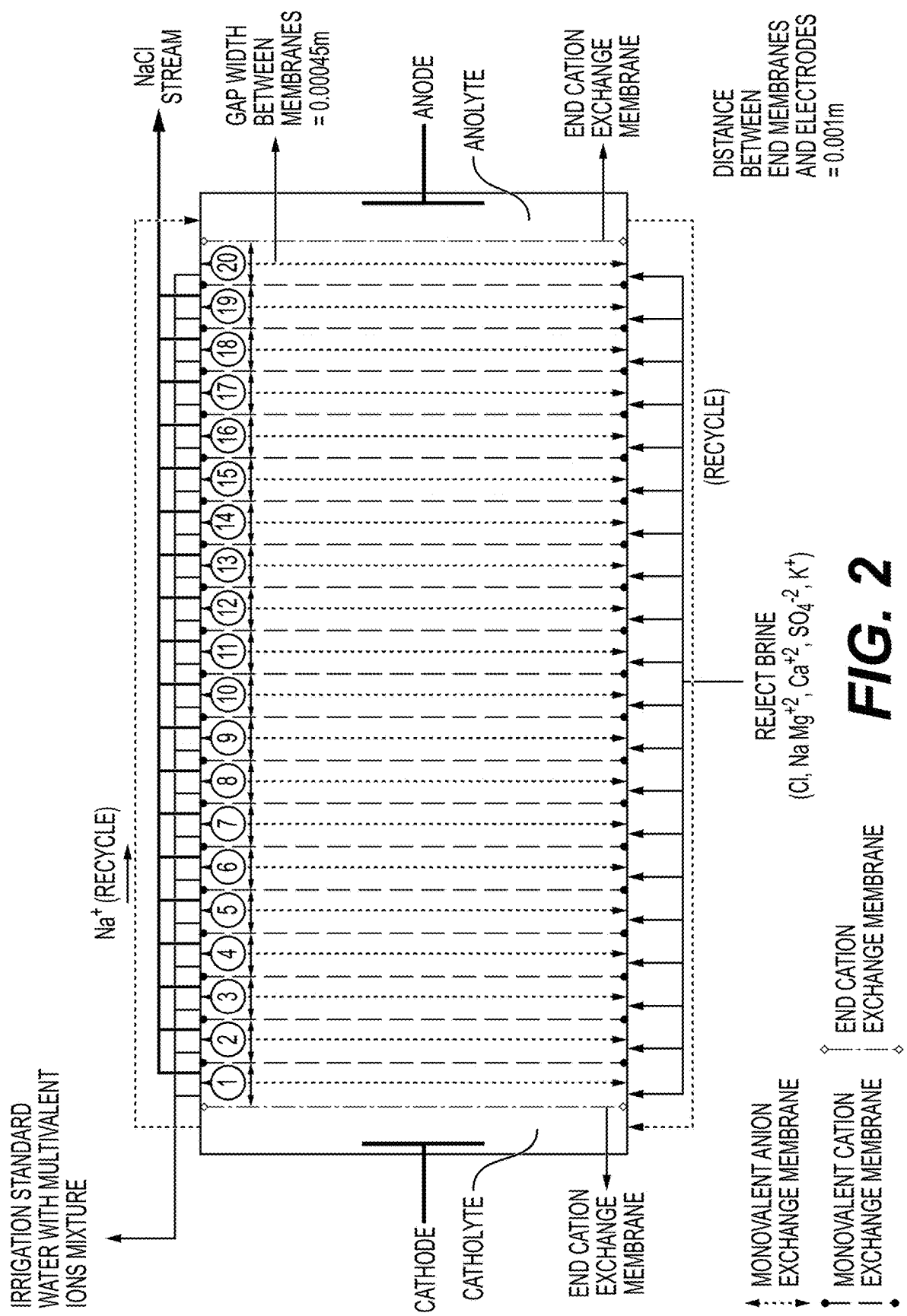
FIG. 2 is a schematic diagram of an embodiment of the first ED stage of the present system with 20 cell pairs.
Figure 3:
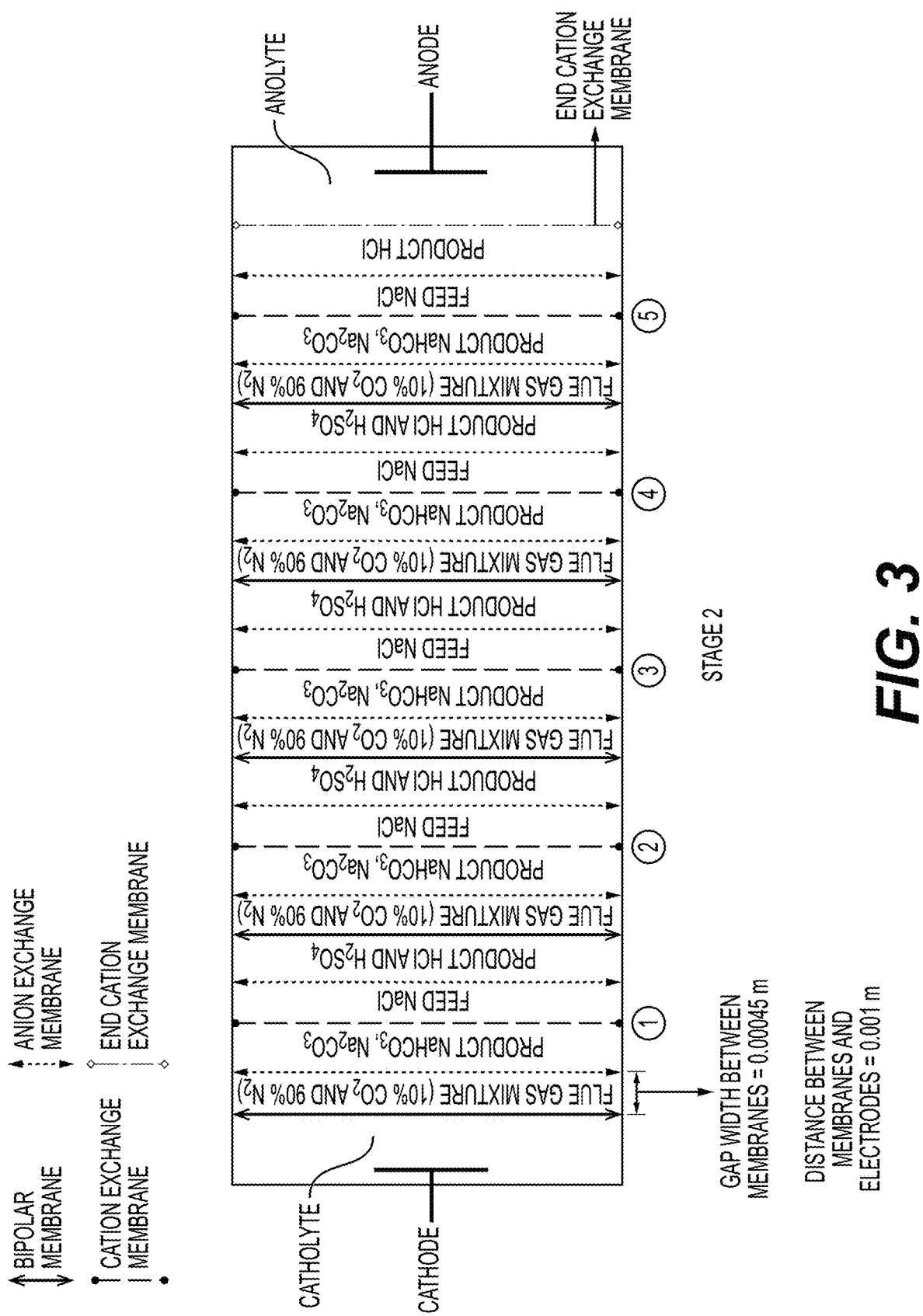
FIG. 3 is a schematic diagram of an embodiment of the second ED stage of the present system including five cell groups with four-chambers.

As shown in FIGS. 2 and 3, both the first ED stage and the second ED stage include a plurality of spaced, semi-permeable membranes positioned between an anode and a cathode. The space between adjacent membranes defines a cell. The anode and the adjacent membrane define an anolyte chamber. The cathode and the adjacent membrane define a catholyte chamber. In the first ED stage and second ED stage, groups of adjacent cells define chambers for receiving and processing brine and gas emissions from an industrial plant.

In the first ED stage, adjacent cell pairs can be grouped together to form chambers for receiving and processing brine or liquid emissions from an industrial plant. In an embodiment, liquid emissions from an industrial plant are transmitted to the multivalent ion chamber in a cell pair and water is transferred to an adjacent monovalent ion chamber in the same cell pair. Each chamber within a cell pair can be separated by an anion exchange membrane and adjacent cell pairs can be separated from one another by a cation exchange membrane. NaCl and monovalent ions from brine in the multivalent ion chamber can pass through the anion exchange membrane into the monovalent ion chamber, leaving water and a multivalent ion mixture in the multivalent ion chamber. Accordingly, each multivalent ion chamber can produce an outlet stream of standard irrigation water with a multivalent ion mixture and each monovalent ion chamber can produce an output stream of concentrated NaCl with monovalent ions. The standard irrigation water with the multivalent ion mixture can be collected and used for agricultural irrigation. The stream of concentrated NaCl can be transferred to the second ED stage.

According to an embodiment, a mixture of flue gases emitted from the industrial plant, the concentrated NaCl brine including monovalent ions from the first ED stage, along with two streams of water can be transferred to the second ED stage. The second ED stage can include a plurality of chambers defined by cell groups between anolyte and catholyte chambers. In an embodiment, the second ED stage can include a flue gas chamber for receiving the flue gas mixture from the industrial plant, a concentrated brine chamber for receiving the concentrated NaCl stream (with monovalent ion mixture) from the first ED stage, an acid chamber between the flue gas chamber and the concentrated brine chamber for producing acid, a carbonate chamber adjacent the concentrated brine chamber for producing carbonates. The second ED stage includes a bubble column reactor which receives one of the water streams and $CO_2$ emitted from the plant. The bubble column reactor dissolves the $CO_2$ to form $CO_3^{-2}$ and $HCO_3^{-1}$ ions which are then circulated continuously in the carbonate chamber. The other stream of water is provided to the acid chamber for acid collection. The sodium and chloride ions from the concentrated brine in the concentrated brine chamber can be shifted to different, adjacent chambers with the help of an electric current. In an embodiment, the chloride ions from the concentrated brine chamber combine with hydrogen ions in the acid chamber to form HCl, whereas sodium ions from the concentrated brine chamber combine with carbonate ($CO_3^{-2}$) and bicarbonate ($HCO_3^{-1}$) ions to form sodium carbonate ($Na_2CO_3$) and $NaHCO_3$ solution. $CO_3^{-2}$ and $HCO_3^{-1}$ ions formation occurs in the bubble column contactor with the dissolution of $CO_2$ in an alkaline solution.

The second ED stage can produce a high concentration of acid (over 90% concentration of HCl, the rest being sulphuric acid ($H_2SO_4$)), clean gas, a brine stream that is suitable for enhanced oil recovery, and a liquid mixture including $Na_2CO_3$ and $NaHCO_3$.

In an embodiment, the liquid carbonate mixture produced in the second stage can be freeze-dried to produce a solid powder mixture of $Na_2CO_3$ and $NaHCO_3$. According to an embodiment, a purity of HCl collected from the second ED stage can exceed about 92%. Thus, in addition to producing useable irrigation water in the first ED stage, the present system produces multiple useable products in the second ED stage.

The system can be configured for continuous circulation of an electrolyte. In the first stage, an electrolyte, e.g., sulphamic acid, can be recirculated through anolyte and catholyte chambers formed respectively between the anode and its adjacent membrane, defining the anolyte chamber, and the cathode and its adjacent membrane (the catholyte chamber). According to an embodiment, water can be formed from the combination of hydrogen ions ($H^+$) generated at the anode and hydroxide ions ($OH^-$) generated at the cathode. In the second ED stage, an anolyte (sulphamic acid) and a catholyte (sodium hydroxide) in the second ED stage can be circulated separately in the anolyte and catholyte chambers, respectively, and do not mix. One or more pumps can be provided to drive the brine through the system and then recycle the output back through the system again. According to an embodiment, a separate pump can be provided for cycling the electrolyte in the first ED stage. According to an embodiment, two separate pumps can be provided in the second ED stage for cycling the electrolyte in the anolyte and catholyte chambers separately, as shown in FIG. 3.

In an embodiment, the industrial plant is a desalination plant. Since brine and $CO_2$ are the most common pollutants emitted by most industries, however, the present system can be integrated with other industries other than desalination plants, such as oil, fertilizer, and cement industries.

According to an embodiment, while the rejected brine from the first stage can include mostly NaCl, some monovalent ions from the original liquid emissions can also be present. In an embodiment, the rejected brine from the first stage can include, for example, sodium, chloride, calcium, magnesium, and potassium ions, initially present in the liquid emissions.

As shown in FIG. 2, an exemplary embodiment of the first ED stage can include an anolyte chamber, a catholyte chamber, and twenty cell pairs therebetween. Each cell pair can define two chambers separated by a monovalent anion exchange membrane. The anion exchange membrane separates the monovalent ions (K+, Na+, Cl−) from the multivalent ions ($Ca^{2+}$, $Mg^{2+}$, $SO_4^{2-}$) in the initial liquid emissions. Each of the cell pairs can be separated from one another by a cation exchange membrane. The cation exchange membrane can collect monovalent ions ($Na^+$, $Cl^-$). According to an embodiment, the first ED stage can include a total of 20 monovalent anion selective membranes, 19 monovalent cation selective membranes, and two end cation exchange membranes. In an embodiment, a rejected brine output from the first stage can include from about 20% to about 95% of the initial sodium chloride ions, calcium, magnesium, and potassium after being processed in the first stage for about 1 hour to about 2 hours. It is preferable that most multivalent ions in the first ED stage are collected by the ion selective membranes and prevented from passing to the second ED stage where they can be precipitated in the form of carbonates, thereby obstructing membrane pores.

In an embodiment, the first ED is a closed-loop process in which an electrolyte is circulated between anolyte and catholyte chambers. In an embodiment, the electrolyte is sulphamic acid. In an embodiment, 0.5 M of sulphamic acid is used as an electrolyte in the first ED stage.

In the first ED stage, OH— generated at the catholyte combines with the anolyte stream, creating H+ to form water. This continuous combination of the catholyte and anolyte stream maximizes the utilization of current density for the separation of monovalent ions from multivalent ions.

In an embodiment, the first ED stage collects most of the multivalent ions that were present in the liquid emissions, leaving an NaCl-rich outlet stream with some monovalent ions to be transferred to the second ED stage. The NaCl produced from the first ED stage can have a purity exceeding about 90%, e.g., about 92%. According to an embodiment, the processing in the first ED stage can last for a first period of time ranging from about 1 hour to about 2 hours, e.g., about 92 minutes.

FIG. 3 is a schematic diagram of an exemplary second ED stage having a total of five cell groups between the anolyte and catholyte chambers. As shown in FIG. 3, the flue gas chamber and the carbonate chamber can be separated by an anion exchange membrane. The carbonate chamber and the concentrated brine chamber can be separated by cation exchange membrane. The concentrated brine chamber and the acid chamber can be separated by an anion exchange membrane. The acid chamber can be separated from an adjacent flue gas chamber by a bipolar membrane. In the first cell group, the flue gas chamber can be separated from the catholyte chamber by a bipolar membrane. In the fifth cell group, the acid chamber can be separated from the anolyte chamber by an end cation exchange membrane. According to an embodiment, the second ED stage can include a total of 5 standard cation exchange membranes, 10 standard anion exchange membranes, 5 bipolar membranes, and 1 end exchange membrane.

In an embodiment, an electrolyte is separately circulated in the anolyte and catholyte chambers of the second ED stage. In an embodiment, the electrolyte in the anolyte chamber is sulphamic acid. In an embodiment, 0.5M of sulphamic acid is used as an electrolyte in the anolyte chamber. In an embodiment, the electrolyte in the catholyte chamber is sodium hydroxide. In an embodiment, 0.1 M of sodium hydroxide is circulated in the catholyte chamber In an embodiment, each of the first and second ED stages can be operated using about 0.5 A to about 0.9 A of current, about 5 to about 20 cells, about 5 L/hr to about 15 L/hr of diluent/concentrate flow, and about 25 L/hr to about 75 L/hr of electrolyte flow.

The average $CO_2$ removal efficiency in the second ED stage can range from about 50% to about 70% with an inlet gas flow rate ranging from about 0.3 l/min to about 0.1 l/min. Due to efficient mixing with the help of the bubble column contactor, the proposed process can capture $CO_2$ from a dilute gas mixture (less concentration of $CO_2$ in a gas mixture); therefore, the $CO_2$ removal efficiency can be further increased by recirculating the released gas from the second ED stage. In an embodiment, the concentration of $CO_3^{-2}$ and $HCO_3^{-1}$ ions in the liquid mixture from the carbonate chamber can be about 0.103 M to about 0.093 M, respectively, after about 420 minutes of operation at optimum conditions.

Figure 4:
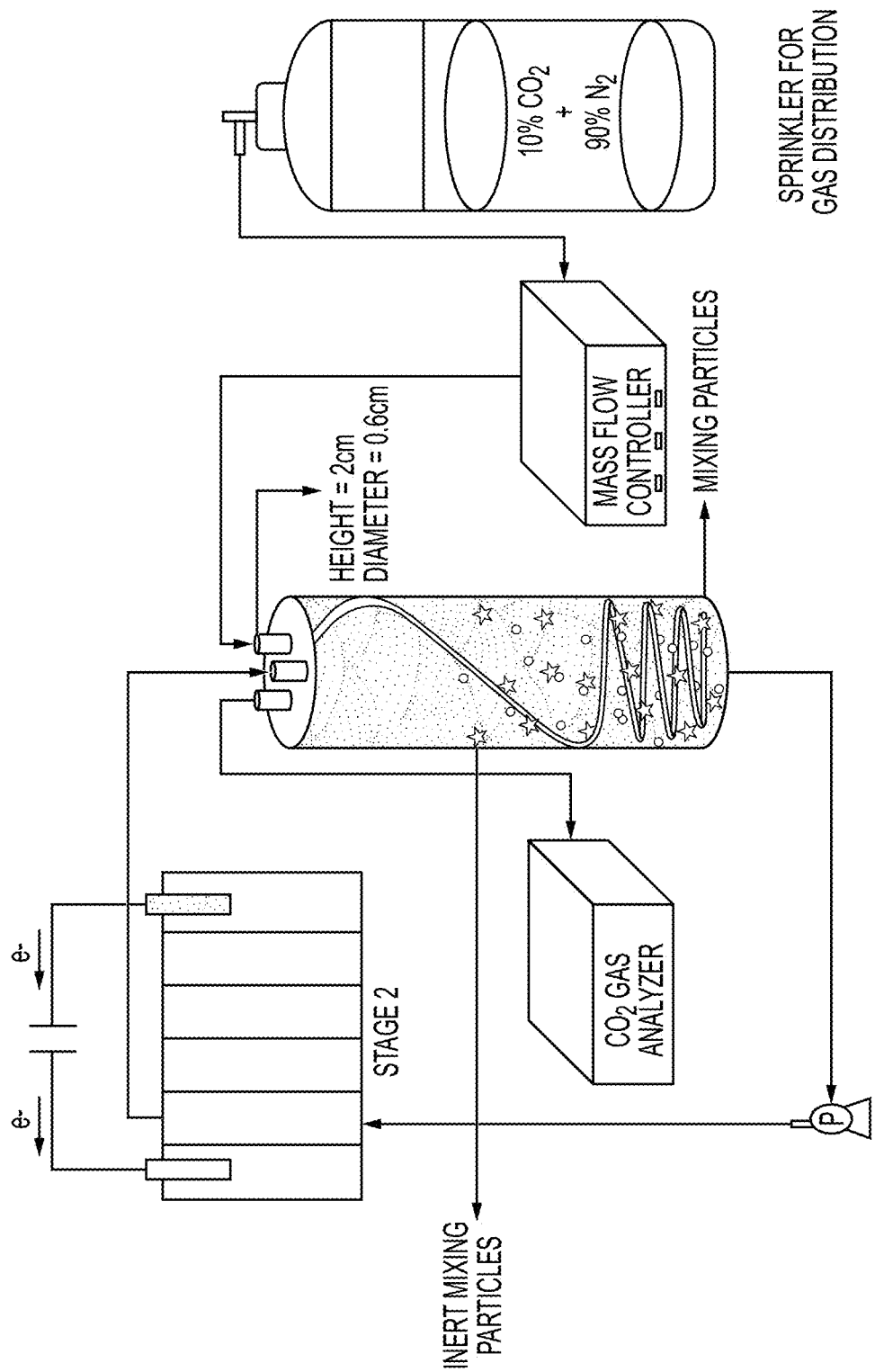
FIG. 4 is a schematic diagram of the bubble contactor connected to the second stage of the present system.

A schematic of the bubble column contactor of the second ED stage is shown in FIG. 4. The flue gas mixture, which can include 10% $CO_2$ and 90% $N_2$, for example, can be transferred into the contactor containing a $Na_2CO_3$ solution with, e.g., an initial conductivity of about 10 mS/cm, to overcome the initial resistance. Bubbles of gas can be introduced through a diffuser into the contactor, containing inert mixing particles. In an embodiment, the inert mixing particles can include polymethylmethacrylate (PMMA). The mixing particles break can down larger gas molecules into smaller molecules, which increases mass transfer between phases. The mixing particles can also increase the gas holdup, resulting in more $CO_2$ dissolution into the solution. Upon dissolving $CO_2$ into the solution, $CO_3^{-2}$ and $HCO_3^{-1}$ ions can pass through the anion exchange membrane into the carbonate chamber to form a mixture of $NaHCO_3$ and $Na_2CO_3$ with small amounts of potassium and chloride. Chloride and sulfate ions can be transferred from the NaCl chamber into the acid chamber through the anion exchange membrane, forming an acid mixture including HCl and $H_2SO_4$. The acid mixture can include more than about 90% HCl.

According to an embodiment, a method of desalinating reject brine and flue gas emitted from an industrial plant can include providing a first electrodialysis (ED) stage including an anolyte chamber, a catholyte chamber, and a plurality of cell pairs therebetween, each cell pair including a multivalent ion chamber and a monovalent ion chamber separated by a monovalent anion exchange membrane; providing reject brine to a multivalent ion chamber and water to the monovalent ion chamber of each cell pair in the first ED stage; transporting ions from the reject brine in the multivalent ion chamber through the anion exchange membrane to the monovalent ion chamber; collecting a stream of irrigation quality water in a first output stream from the multivalent ion chamber and a concentrated NaCl rejected brine in a second output stream from the monovalent ion chamber; providing a second ED stage including a plurality of cell groups between anolyte and catholyte chambers, each of the cell groups including a flue gas chamber, a carbonate chamber, an anion exchange membrane separating the flue gas chamber and the carbonate chamber, a concentrated brine chamber, a cation exchange membrane separating the carbonate chamber and the concentrated brine chamber, an acid chamber, and an anion exchange membrane separating the concentrated brine chamber and the acid chamber; providing concentrated NaCl reject brine from the first ED stage to the concentrated brine chamber; providing water to the acid chamber, dissolving $CO_2$ from flue gas from an industrial plant to provide $CO_3^{-2}$ and $HCO_3^{-1}$ ions using a bubble column contactor; transporting the $CO_3^{-2}$ and $HCO_3^{-1}$ ions to the carbonate chamber, transporting sodium ions from the concentrated brine chamber to the carbonate chamber through the cation exchange membrane to produce a sodium carbonate mixture; transporting Cl ions from the concentrated brine chamber to the acid chamber through the anion exchange membrane to produce an acid mixture. In an embodiment the carbonate mixture includes a mixture of $Na_2CO_3$ and $NaHCO_3$. In an embodiment, the acid mixture can include HCl or HCl and $H_2SO_4$. In an embodiment, the $Na_2CO_3$ and $NaHCO_3$ mixture is transferred to a freeze drier to produce a solid powder mixture of $Na_2CO_3$ and $NaHCO_3$.

In an embodiment, the flue gas includes about 10% $CO_2$ and about 90% $N_2$. In an embodiment, the industrial plant is a desalination plant and the present method is used onsite for desalination of rejected brine from desalination emissions and for $CO_2$ recapture. As is conventionally known, a recirculating electrolyte stream may flow through the anode and cathode chambers formed respectively between the anode and its adjacent membrane and the cathode and its adjacent membrane.

The present method can eliminate pollutants with no environmental impact. In an embodiment, water used in the first ED stage and the second ED stage is selected from brackish water, seawater, and distilled water. In an embodiment, an inlet of the second ED stage includes two streams of water and one stream of concentrated NaCl brine transferred from the first ED stage. In an embodiment, producing an acid mixture and a liquid mixture including $Na_2CO_3$ and $NaHCO_3$ in the second ED stage includes dissolving $CO_2$ into a bubble column reactor to form $CO_3^{-2}$ and $HCO_3^{-1}$ ions, with the dissolved $CO_2$ being circulated continuously in a separate chamber while the other stream of distilled water is used for acid collection in the acid chamber.

According to an embodiment, output from the second ED stage includes high concentrations of acid (over 90% concentration of HCl, the rest being sulphuric acid ($H_2SO_4$)), clean gas, a brine stream that is suitable for enhanced oil recovery, and a liquid mixture containing $Na_2CO_3$ and $NaHCO_3$ with small impurities.

According to an embodiment, a solid powder mixture of $Na_2CO_3$ and $NaHCO_3$ is formed by freeze-drying the liquid carbonate mixture. The water removed from the freeze-drying operation can be pure water without any ions and can be reused in the second ED stage in the carbonate chamber.

An exemplary embodiment of the first ED stage can include a total of 20 monovalent anion selective membranes, 19 monovalent cation selective membranes, and 2 end cation exchange membranes. The membranes can be acquired from PCCELL GMBH. The end membranes in the first and second ED stages can be selected based on two properties: their resistance to oxidation media produced at the anode (traces of $Cl_2$, $H_2O_2$, oxidized sulfates, etc.) and their ability to withstand high-pressure differences. The end membranes in the first and second ED stages can be made from sulphonic acid reinforced with polyethylene. The monovalent anion selective membranes can include ammonium with polyester reinforcement. The monovalent cation selective membranes can include sulfonic acid with polyester reinforcement. Polyester spacers can be used between the membranes in the first and second ED stages. Each of the chambers between the anolyte and catholyte chambers can have a circulation cylinder or pump. A separate cylinder or pump can be provided for continuous electrolyte in the anolyte and catholyte chambers. Water can be formed from the combination of hydrogen ions ($H^+$) generated at the anode and hydroxide ions ($OH^-$) generated at the cathode in the first ED stage.

An exemplary embodiment of the second ED stage can include a total of 5 standard cation exchange membranes, 10 standard anion exchange membranes, 5 bipolar membranes, and 1 end exchange membrane. The membranes can be acquired from PCCell GMBH. The anion exchange membranes can include ammonium with polyester reinforcement. The cation exchange membranes can include sulfonic acid with polyester reinforcement.

The system for treating reject brine and capturing carbon dioxide ($CO_2$) can operate at room temperature and standard pressure to simultaneously capture $CO_2$ from the flue gas mixture and treat real rejected brine. An efficiency of the system can be enhanced by increasing the number of cell pairs or cell groups between the catholyte and anolyte chambers. As described herein, the system can produce multiple by-products with relatively high purity and zero environmental discharge.

Stage 1 and 2 processes can be carried out in a batch or continuous mode (for liquids and dissolved gas streams).

Both of the ED stages can use titanium electrodes. In an embodiment, the anode can be coated with platinum and iridium oxide.

According to various embodiments, the rejected brine from the desalination plant can include 17000 ppm sodium, 31000 ppm chloride, 5352 ppm sulfate, 2460 ppm magnesium, 810 ppm potassium, and 586 ppm calcium. After the first ED stage, the rejected brine can include 4680 ppm sodium, 10400 ppm chloride, 3784 ppm sulfate, 2305 ppm magnesium, 184 ppm potassium, and 500 ppm calcium. Maximum removal of the fouling-prone species, such as calcium and magnesium can be obtained in the first ED stage before shifting the NaCl dominant stream to the second ED stage. The conductivity of rejected brine in the first ED stage can be reduced from 80 mS/cm to 30 mS/cm. Overall, 94%, 85%, and 71% rejection of magnesium, calcium, and sulfate ions can be obtained in the first ED stage at the end of 92 minutes.

According to an embodiment, the liquid carbonate mixture from the carbonate chamber can be freeze-dried at −70° C. and ~1 Pa vacuum pressure to form a solid carbonate mixture.

In experiment, when the conductivity of the NaCl chamber in the second ED reached 20 mS/cm, the fraction of $CO_3^{-2}$ and $HCO_3^{-1}$ ions in the carbonate chamber was determined using a 2 step titration method and found to be 0.103 M $CO_3^{-2}$ and 0.093 M $HCO_3^{-1}$.

In the second ED stage, when conductivity of the NaCl chamber reached 20 mS/cm, calcium, magnesium, and sulfate, which are leaked from the brine chamber to the monovalent ion chamber in the first ED stage, were further reduced by 31%, 76%, and 50%, respectively.

In the second ED stage, the average $CO_2$ removal efficiency was 50%, and the pH decreased from 11.1 to 9.64 when the NaCl chamber conductivity reached 20 mS/cm. It took 414 minutes for the NaCl chamber conductivity to reach 20 mS/cm. A total of 9243 ppm of HCl was produced when the conductivity reached 20 mS/cm in the NaCl chamber.

Many conventional treatment systems for industrial waste and emissions are associated with significant precipitation of multivalent ions which lower the purity and quantity of products. The present system, however, removes multivalent ions in the first ED stage as a liquid by-product, thereby preventing precipitation in the second ED stage.

Due to the low generation of fouling-prone species, such as calcium and magnesium, seawater can be used instead of distilled water in the first and second ED stages. The irrigation water collected from the first ED stage can be an ideal fertilizer liquid after the reduction of NaCl concentration (and accumulation of calcium and magnesium ions). In the second ED stage, the NaCl concentration from the brine collected from the first ED stage can be reduced, and the processed seawater stream can be ideally used for enhanced oil recovery since a higher concentration of NaCl reduces oil recovery.

Figure 5A:
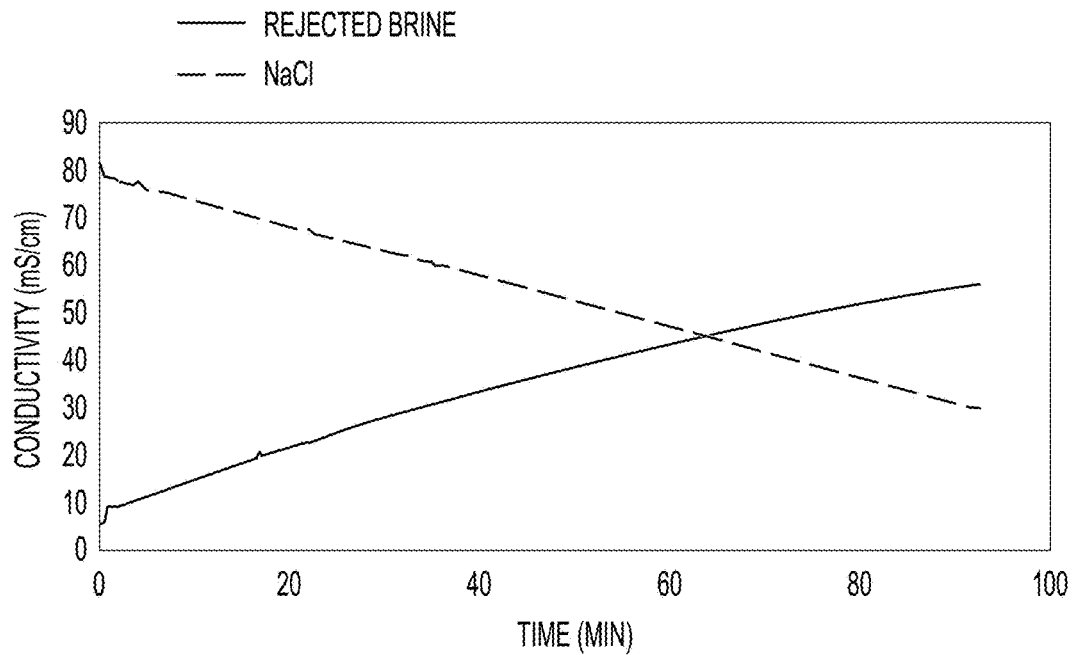
FIGS. 5A-5C depict the conductivity and $CO_2$ removal efficiency of different chambers after (FIG. 5A) 92 minutes of maintaining the flow rates of both chambers at 15 l/hr, the electrolyte flow rate at 72.91 l/hr, and the number of cell pairs at 20.
Figure 5B:
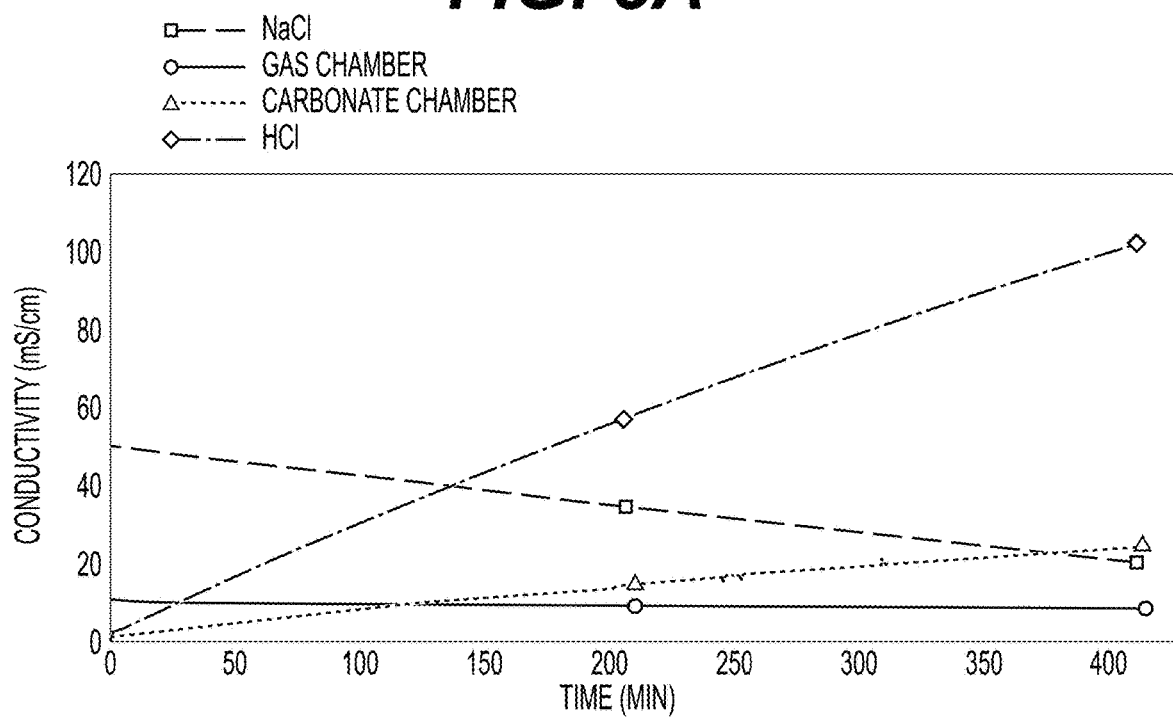
Figure 5C:
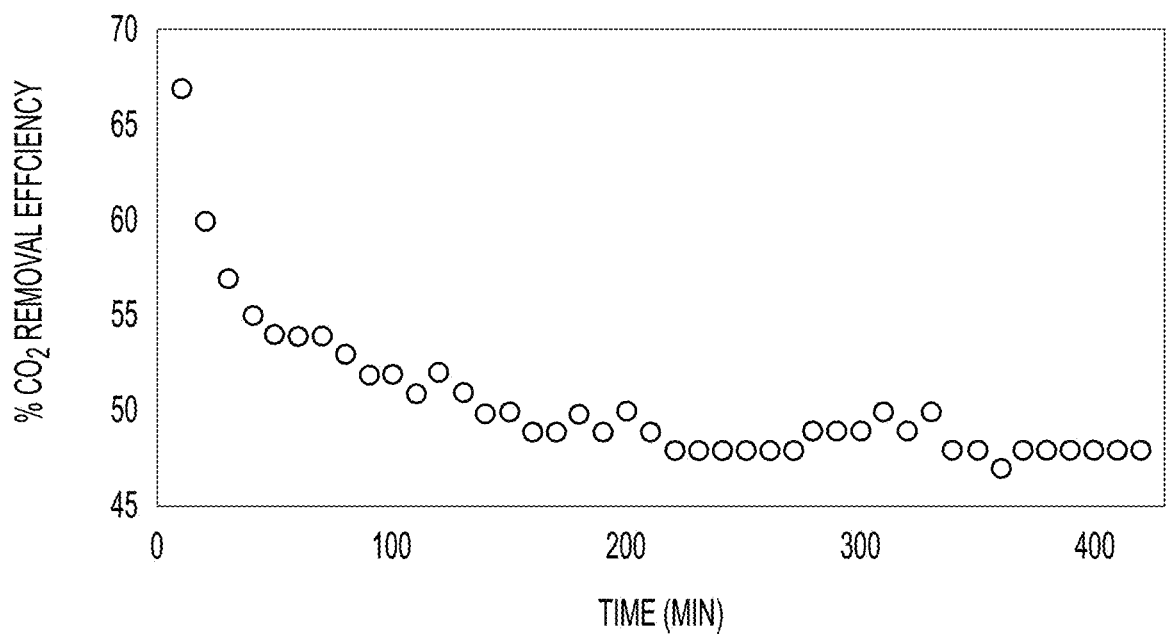

FIGS. 5A-5C illustrate the conductivity and $CO_2$ removal efficiency of different chambers over time. In the first ED stage, after 92 minutes of maintaining the flow rates of both chambers at 15 l/hr, the electrolyte flow rate at 72.91 l/hr, and the number of cell pairs at 20, the conductivity of rejected brine drops to 30 mS/cm, whereas the conductivity of NaCl chambers increases to 55 mS/cm, as shown in FIG. 5A. In the second ED stage, the acid (HCl) chamber's conductivity increased to 413 mS/cm, while the NaCl (concentrated brine) chamber's conductivity decreased to 20 mS/cm after 420 minutes. As shown in FIG. 5B, the conductivity of the carbonate chamber increased to 24 mS/cm while the conductivity of the flue gas chamber remained constant, indicating that absorption is constant. FIG. 5(C) illustrates that $CO_2$ absorption becomes constant after an initial fluctuation.

Figure 6:
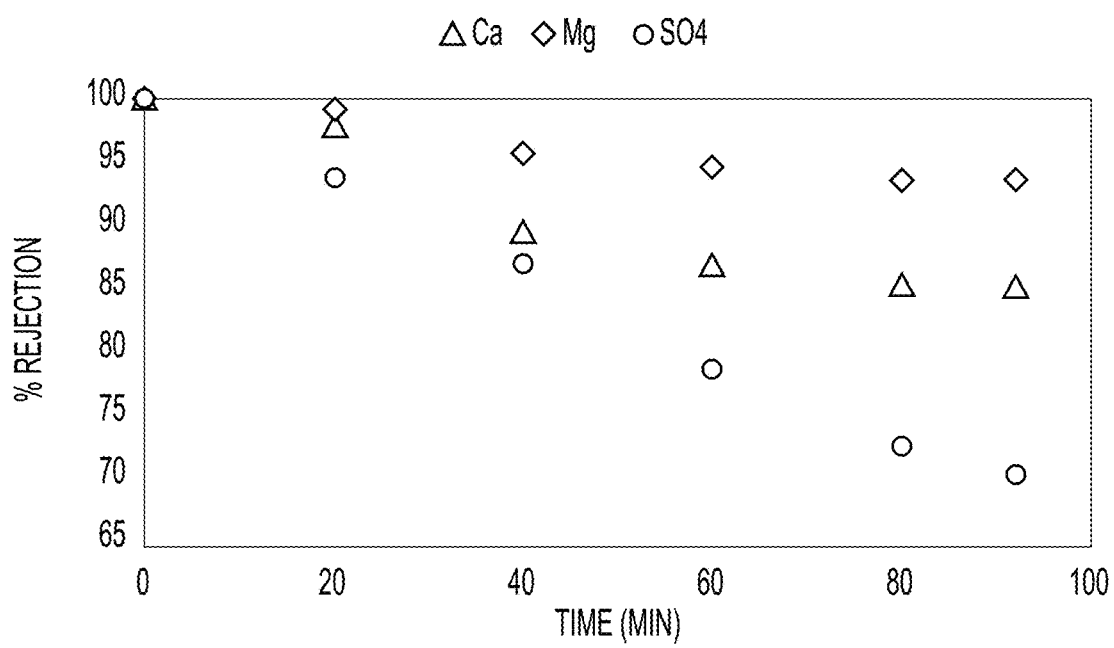
FIG. 6 is a graph showing the rejection rate of multivalent ions in the first ED stage over time by keeping the current at 0.7 A, cell pairs at 20, dilute/concentrate flow rate at 15 l/hr, and electrolyte flow rate at 72.91 l/hr.

FIG. 6 shows the rejection rate of multivalent ions in the first ED stage over time by keeping the current at 0.7 A, cell pairs at 20, dilute/concentrate flow rate at 15 l/hr, and electrolyte flow rate at 72.91 l/hr. The rejection of all multivalent ions present in the rejected brine declines with time as the concentration of NaCl (major ions in rejected brine) decreases sharply. When NaCl concentrations decrease, multivalent ions tend to make contact with membrane surfaces more frequently, which causes leakage of ions. The rejection rate for magnesium, calcium, and sulfate ions is 94%, 85%, and 71%, respectively, after 92 minutes in stage 1. Magnesium and calcium have a higher hydrated radius than sulfate, which accounts for their higher rejection rates.

FIGS. 7A-7D show SEM images of a freeze-dried solid carbonates mixture at different resolutions. SEM images are taken at 20 kV and 10 kV acceleration potentials, which according to the instrument's specifications, provide a resolution of 100 μm, 50 μm, and 40 μm. Agglomerates of particles can be seen in the images. Absorption of water into soluble compounds can increase molecular mobility, resulting in liquid bridges between neighboring particles, causing caking and agglomeration. Particle agglomeration can be prevented by applying high freezing rates before freeze-drying.

Figure 7A:
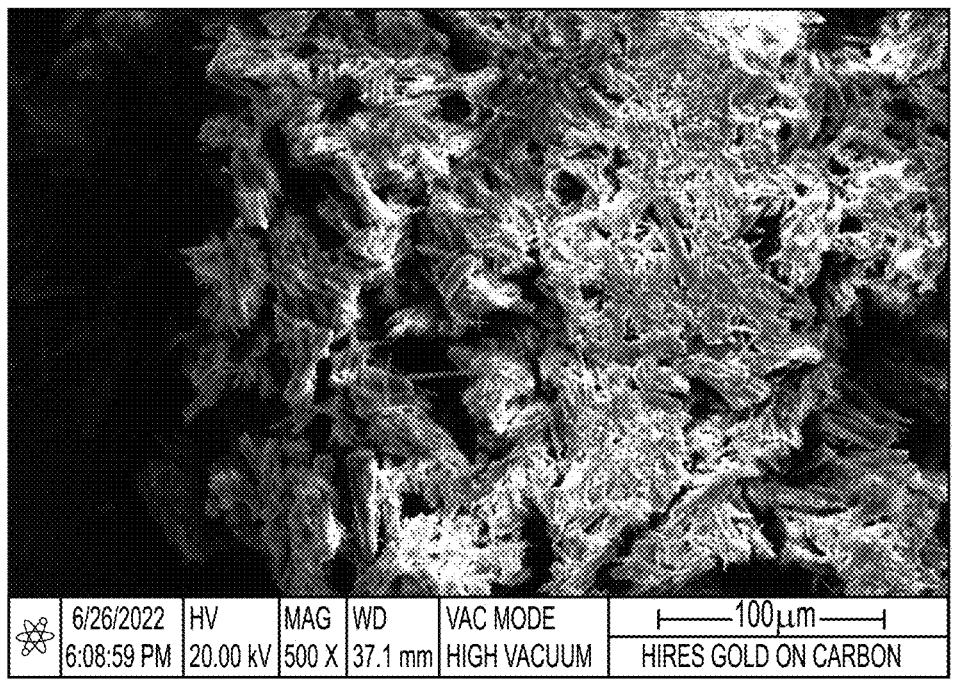
FIGS. 7A-7D are scanning electron microscopy (SEM) images of a freeze-dried solid carbonates mixture at different resolutions.
Figure 7B:
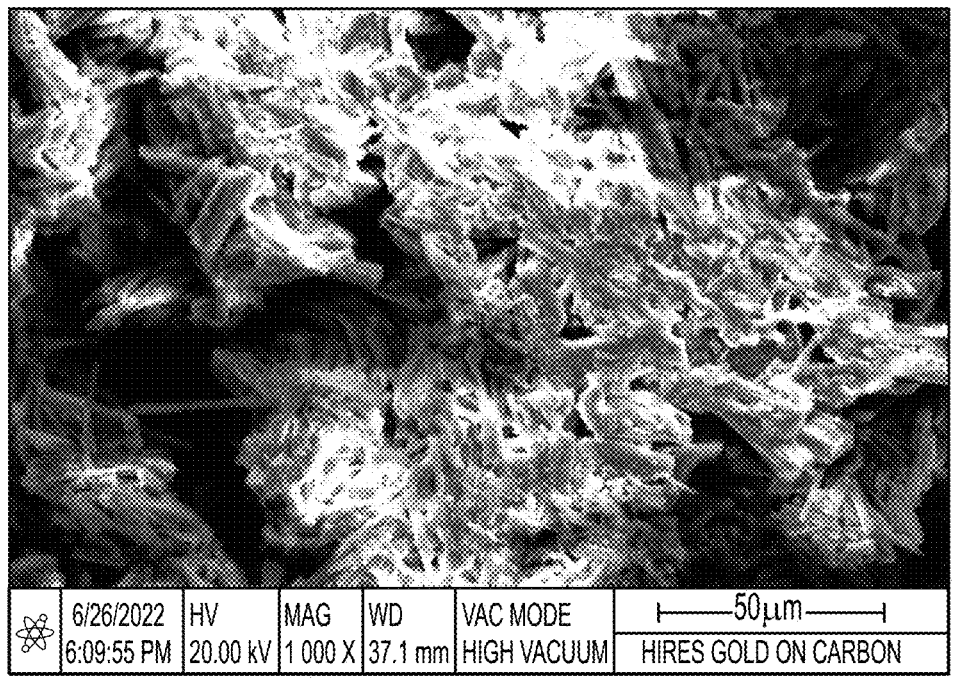
Figure 7C:
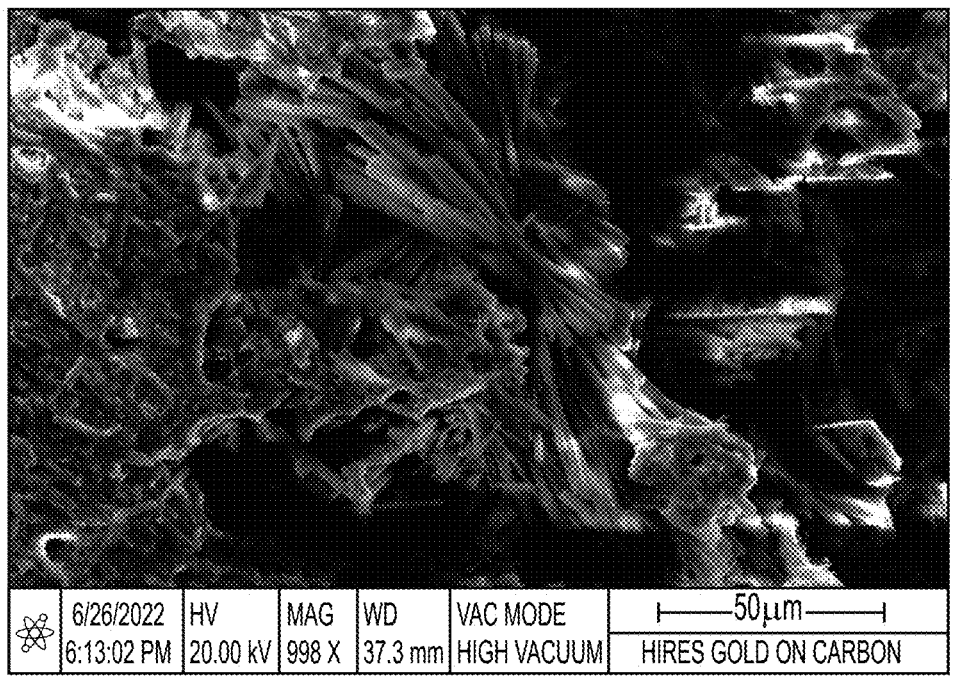
Figure 7D:
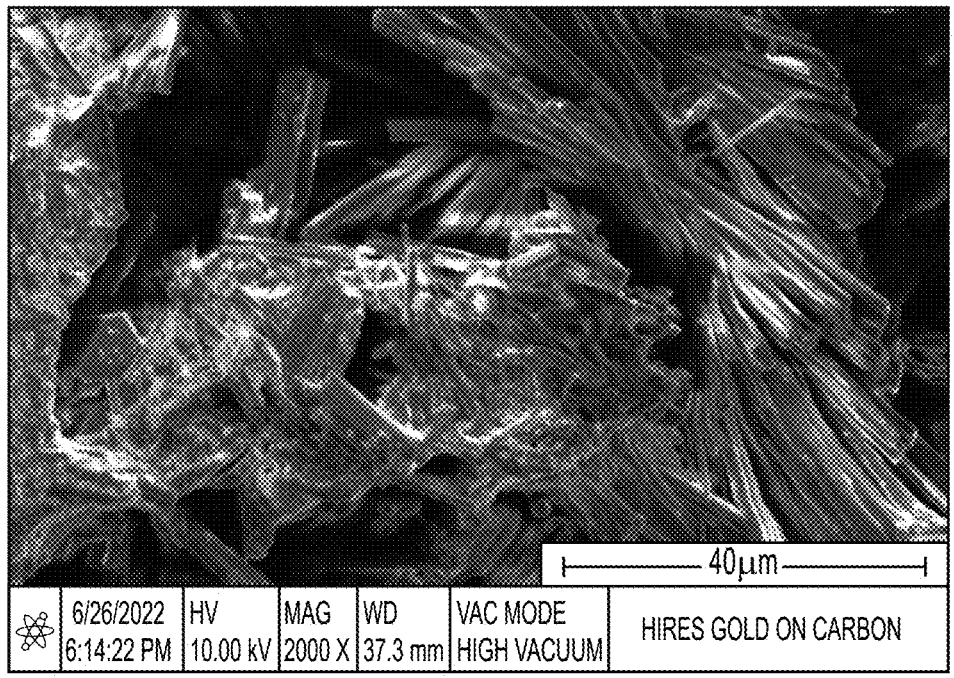
Figure 7E:
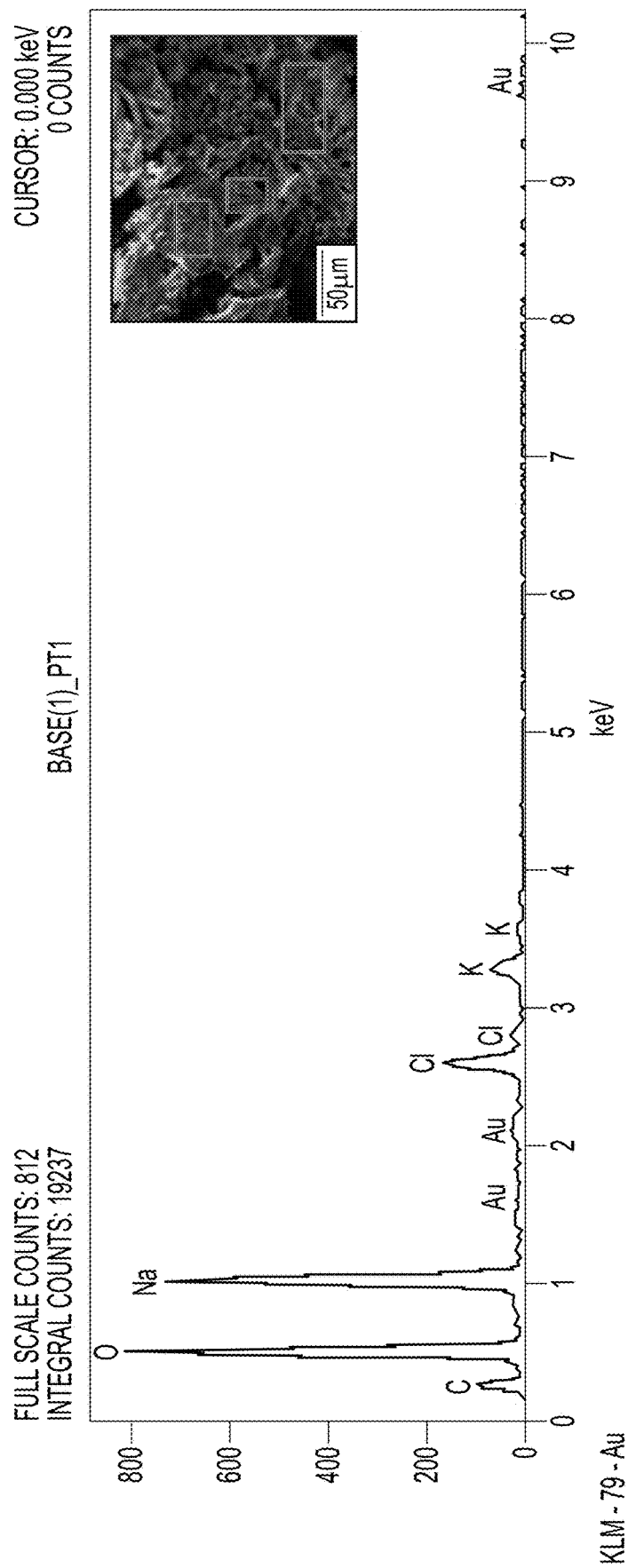
FIG. 7E shows the results of Energy Dispersive X-ray (EDX) analysis coupled with SEM using mixed BSE (back scatter electron) and LSE (lateral secondary electron) detectors.

Table 1 and FIG. 7(e) show the results of the EDX analysis. EDX is coupled with SEM using mixed BSE (back scatter electron) and LSE (lateral secondary electron) detectors. EDX analysis shows the atomic weight % of various elements in the freeze-dried carbonate mixture. Sodium, oxygen, carbon, potassium, chlorine, and gold are detected in the EDX analysis. Due to the gold coating deposited on the samples before SEM-EDX analysis, gold peaks have been observed in EDX analysis. In the carbonate chamber, chlorine diffusion is about 2-4%, while potassium leakage is less than 2%. In the first ED stage, potassium can pass through a monovalent selective membrane due to its monovalency. Due to the lower potassium concentration in the brine sample, however, potassium interacts less with the membrane surface, resulting in lower potassium passage. As a result, only 2% of potassium is detected in the final carbonate sample. EDX analysis in Table 1 indicates that sodium-based carbonate mixtures can be produced with high purity due to carbon, sodium, and oxygen atomic weight percentages exceeding 94%.

TABLE 1

| The atomic weight percentage of elements | | | | | | |
|---|---|---|---|---|---|---|
| Points | C | O | Na | Cl | K | Au |
| 1 | 13.06 | 58.08 | 23.39 | 3.78 | 1.69 | 0.00 |
| 2 | 11.57 | 61.74 | 26.41 | | 0.09 | 0.19 |
| 3 | 11.34 | 60.79 | 24.40 | 2.24 | 1.21 | |

It is to be understood that the system for treating reject brine and capturing carbon dioxide ($CO_2$) is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A method of desalinating reject brine and flue gas emitted from an industrial plant, comprising:
providing a first electrodialysis (ED) stage including a first anolyte chamber, a first catholyte chamber, and a plurality of cell pairs therebetween, each of the cell pairs including a multivalent ion chamber and a monovalent ion chamber separated by a first anion exchange membrane;
providing reject brine from the industrial plant to the multivalent ion chamber and water to the monovalent ion chamber of each of the cell pairs in the first ED stage;
transporting NaCl and monovalent ions from the reject brine in the multivalent ion chamber through the first anion exchange membrane to the monovalent ion chamber;
collecting a stream of water and a multivalent ion mixture in a first output stream from the multivalent ion chamber and a concentrated NaCl rejected brine in a second output stream from the monovalent ion chamber;
providing a second ED stage including a plurality of cell groups between second anolyte and catholyte chambers, each of the cell groups including a flue gas chamber, a carbonate chamber, a second anion exchange membrane separating the flue gas chamber and the carbonate chamber, a concentrated brine chamber, a cation exchange membrane separating the carbonate chamber and the concentrated brine chamber, an acid chamber, and a third anion exchange membrane separating the concentrated brine chamber and the acid chamber;

providing concentrated NaCl reject brine from the first ED stage to the concentrated brine chamber;

providing water to the acid chamber;

dissolving $CO_2$ from flue gas emitted from the industrial plant to provide $CO_3^{-2}$ and $HCO_3^{-1}$ ions from $CO_2$ using a bubble column contactor;

transporting the $CO_3^{-2}$ and $HCO_3^{-1}$ ions to the carbonate chamber through the second anion exchange membrane between the flue gas chamber and the carbonate chamber;

transporting sodium ions from the concentrated brine chamber to the carbonate chamber through the cation exchange membrane to produce a sodium carbonate mixture; and transporting Cl ions from the concentrated brine chamber to the acid chamber through the third anion exchange membrane to produce an acid mixture.

2. The method of claim 1, wherein the sodium carbonate mixture includes $Na_2CO_3$ and $NaHCO_3$.

3. The method of claim 2, further comprising transferring the sodium carbonate mixture to a freeze dryer to produce a solid powder mixture of $Na_2CO_3$ and $NaHCO_3$.

4. The method of claim 1, wherein an electrolyte is circulated between the first catholyte and anolyte chambers of the first ED stage.

5. The method of claim 4, wherein the electrolyte is sulphamic acid.

6. The method of claim 1, wherein an electrolyte is separately circulated in each of the second anolyte and catholyte chambers of the second ED stage.

7. The method of claim 6, wherein the electrolyte circulated in the anolyte chamber is sulphamic acid and the electrolyte circulated in the catholyte chamber is sodium hydroxide.

8. The method of claim 1, wherein the flue gas includes about 10% $CO_2$.

* * * * *